M. Newlove,

Brick-Mold.

No. 98,181.                    Patented Dec. 21, 1869.

Witnesses,
Chas. Nida
Alex F. Roberts

Inventor,
M. Newlove
per Munn
Attorneys.

United States Patent Office.

MATTHEW NEWLOVE, OF BURLINGTON, IOWA, ASSIGNOR TO HIMSELF AND SAMUEL GILBERT, OF SAME PLACE.

Letters Patent No. 98,181, dated December 21, 1869.

IMPROVEMENT IN BRICK-MOULDS.

The Schedule referred to in these Letters Patent and making part of the same.

*To all whom it may concern:*

Be it known that I, MATTHEW NEWLOVE, of Burlington, in the county of Des Moines, and State of Iowa, have invented a new and improved Brick-Mould; and I do hereby declare that the following is a full, clear, and exact description thereof, which will enable others skilled in the art to make and use the same, reference being had to the accompanying drawing, forming part of this specification.

This invention relates to improvements in moulds for shaping and pressing brick; and consists of a mould-box, with movable bottoms or followers permanently connected to a bar, extending along all the mould in the box, and connected to bell-crank levers, pivoted to fixed bearings on the box, and so arranged as to force the movable bottoms or followers through the mould-boxes, when required, for discharging the moulded bricks and for pressing them, which is done by turning the mould bottom up, after filling, and forcing the followers through the mould-boxes, which raises the boxes in a way to rest the weight thereof on the bricks and discharge them.

The followers are covered on their working faces with sheets of vulcanized India rubber, the edges of which, rubbing the sides of the mould, keep them clean, and the formed bricks are more readily and smoothly detached from this substance than from the surface of board followers.

Figure 1:
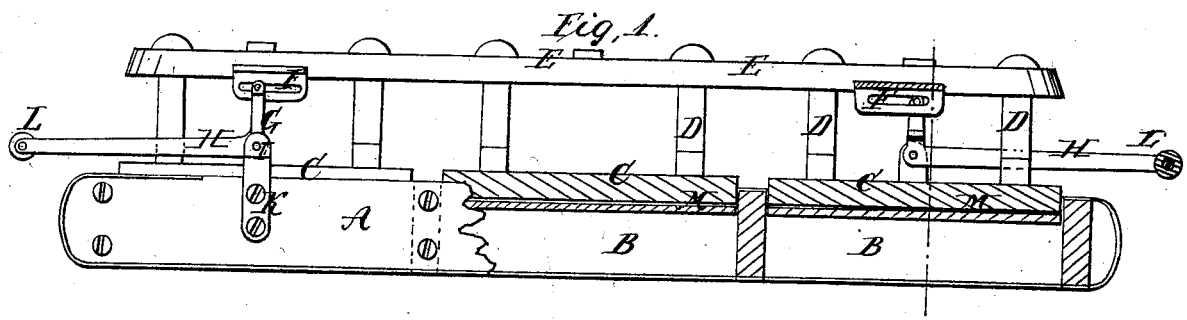
Figure 2:
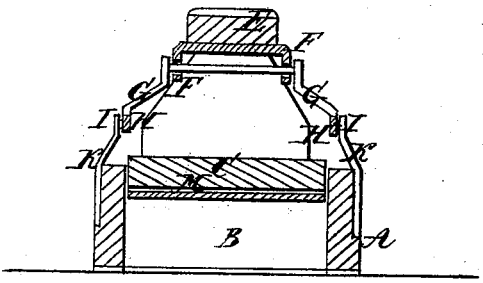

Figure 1 is a view of my improved mould, partly in section and partly in side elevation, and Figure 2 is a transverse section of the same.

Similar letters of reference indicate corresponding parts.

A is a long frame or box, divided into as many sections or moulds, B, as required, and C are the movable bottoms or followers, one for each section.

These bottoms are connected by the studs D to the bar E, extending the whole length of the box, or nearly so, and parallel with the bottom thereof.

Near each end it is connected by slotted plates, F, to stud pins, on the short arms G of bell-crank levers H, pivoted at I to stands K, connected to the sides of the box A.

A pair of these levers is arranged at each end, and connected at the ends of the long arms by handles L.

M represents sheets of vulcanized India rubber, attached to the faces of the followers.

The clay, after being properly ground and tempered, is placed in the mould-boxes B, and they are turned over on a floor, in the position represented in the drawing. Force is then applied to the bar E, and it is moved in the direction to force the followers through the moulds, whereby the clay is pressed against the floor and sides of the moulds into shape, and when it becomes so condensed as to offer resistance greater than the weight of the apparatus, the latter will be raised above the moulded bricks; it may then be lifted off, leaving the bricks on the floor to dry.

The mould-boxes are then turned the other side up to receive the clay, and by means of the handles and bell-cranks the boxes are raised and supported above the followers to receive another charge.

Having thus described my invention,

I claim as new, and desire to secure by Letters Patent—

1. The arrangement of the levers H H, having round knobs, L L, on their handles, independently, and so as to operate from both ends of the mould, in the manner set forth.

2. The combination of levers H, followers C, subdivided mould-box A, frame E D, and slotted plates F F, all constructed and arranged as described.

The above specification of my invention, signed by me, this      day of          , 1869.

MATTHEW NEWLOVE.

Witnesses:
LOUES STROBEL,
DAVID RIPLEY.